(12) United States Patent
Osborn et al.

(10) Patent No.: US 11,285,670 B2
(45) Date of Patent: Mar. 29, 2022

(54) LASER FABRICATION ADDITIVE SYSTEM AND METHOD

(71) Applicant: THE BOEING COMPANY, Chicago, IL (US)

(72) Inventors: Hayden S. Osborn, Seattle, WA (US); Michael T. Hilliard, Lynnwood, WA (US); Robert L. Kearney, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 144 days.

(21) Appl. No.: 16/112,929

(22) Filed: Aug. 27, 2018

(65) Prior Publication Data
US 2020/0061917 A1    Feb. 27, 2020

(51) Int. Cl.
| | |
|---|---|
| *B29C 64/268* | (2017.01) |
| *H01S 3/00* | (2006.01) |
| *B33Y 30/00* | (2015.01) |
| *B33Y 10/00* | (2015.01) |
| *B29C 64/153* | (2017.01) |
| *B29C 64/135* | (2017.01) |
| *G02B 26/08* | (2006.01) |
| *H01S 3/16* | (2006.01) |

(Continued)

(52) U.S. Cl.
CPC ............ *B29C 64/268* (2017.08); *B33Y 30/00* (2014.12); *H01S 3/0071* (2013.01); *B29C 64/135* (2017.08); *B29C 64/153* (2017.08); *B33Y 10/00* (2014.12); *G02B 26/0816* (2013.01); *H01S 3/1611* (2013.01); *H01S 3/1643* (2013.01); *H01S 3/2232* (2013.01); *H01S 3/2383* (2013.01)

(58) Field of Classification Search
CPC ...... B29C 64/268; B33Y 30/00; H01S 3/0071
See application file for complete search history.

(56) References Cited

U.S. PATENT DOCUMENTS

| | | | | |
|---|---|---|---|---|
| 4,354,196 A | * | 10/1982 | Neumann | B23K 26/08 347/248 |
| 5,013,886 A | * | 5/1991 | Koegl | B23K 26/0342 219/121.62 |
| 5,155,324 A | | 10/1992 | Deckard et al. | |

(Continued)

OTHER PUBLICATIONS https://www.ipghotonics.com/en/products/beam-delivery/beam-switches Aug. 2018.

(Continued)

*Primary Examiner* — Joseph S Del Sole
*Assistant Examiner* — John Robitaille
(74) *Attorney, Agent, or Firm* — Marshall, Gerstein & Borun LLP (57) ABSTRACT

A laser assembly for additive manufacturing which includes a first laser beam aligned in a first direction and a first partial reflecting fixed mirror positioned aligned with the first direction which reflects a first portion of the first laser beam in a second direction and an exponentially reduced remaining second portion of the first laser beam passes through the first partial reflecting fixed mirror in the first direction. The laser beam assembly further includes a first oscillating mirror positioned aligned with the second direction of the first portion of the first laser beam wherein the first portion of the first laser beam is refracted by the first oscillating mirror in a third direction.

20 Claims, 5 Drawing Sheets

(51) Int. Cl.
   *H01S 3/223*   (2006.01)
   *H01S 3/23*    (2006.01)

(56) References Cited

U.S. PATENT DOCUMENTS

| | | |
|---|---|---|
| 5,182,715 A | 1/1993 | Vorgitch et al. |
| 6,462,306 B1 | 10/2002 | Kitai et al. |
| 6,521,866 B1 | 2/2003 | Arai et al. |
| 2014/0198365 A1 | 7/2014 | Li et al. |
| 2015/0273631 A1* | 10/2015 | Kenney ............ C22C 1/0416 419/53 |
| 2017/0291356 A1 | 10/2017 | Adachi et al. |

OTHER PUBLICATIONS

Extended European Search Report for EP Application No. 19187538.4 dated Feb. 3, 2020.
Communication Pursuant to Article 94(3) EPC for EP Application No. 19187538.4 dated Jun. 8, 2021.

* cited by examiner

LASER FABRICATION ADDITIVE SYSTEM AND METHOD

FIELD

This disclosure relates to additive fabrication of components and more particularly additive fabrication wherein the additive fabrication is implemented with a laser light beam.

BACKGROUND

Additive manufacturing processes have been developed for fabricating components that would otherwise be difficult to produce. Additive manufacturing provides a number of advantages in the production of parts with presenting freedom for design with the ability to manufacture these parts from a wide variety of materials. Different techniques of additive manufacturing have been developed such as selective laser sintering which fuses or sinters successive powder or resin layers to produce a part. Other additive manufacturing processes may employ a liquid resin; may include fused deposition for solid materials; or laminated object manufacturing for sheets of material.

In employing an additive manufacturing process such as selective laser sintering of powders such as polymers or performing stereo-lithography of resins, difficulties can arise with laser beam divergence as the distance of travel of the laser beam increases across the polymer powder or resin bed. As distance of travel of the laser beam increases across the powder or resin bed, the resulting part being manufactured has limits in build quality and capacity. In attempt to counter these limitations, additional laser beam sources can be added to apply to the powder or resin bed to reduce travel of the laser beam, however, the adding of additional laser sources can present quality of manufacturing issues with occurrence of power variations between the various lasers beams being applied to the powder or resin bed.

Single laser beam sources introduce slow processing time and small build capacity. Lower quality of portions of the part can still occur in locations in the bed where the laser beam traveled greater distances and experienced beam divergence. Increasing the number of laser sources requires calibration of power settings and position, but the occurrence of lower build quality for the part as a result of beam divergence can still occur.

There is a need to increase capacity of production and increase the quality of the parts being produced. The improved quality of the part being built includes providing a more consistent amount of energy being imparted to the bed with reducing the occurrence of power variations from use of different laser beams from different sources and reduce the demand for calibration on power settings.

SUMMARY

An example includes a laser assembly for additive manufacturing which includes a first laser beam aligned in a first direction and a first partial reflecting fixed mirror positioned aligned with the first direction which reflects a first portion of the first laser beam in a second direction and an exponentially reduced remaining second portion of the first laser beam passes through the first partial reflecting fixed mirror in the first direction. The laser assembly further includes a first oscillating mirror positioned aligned with the second direction of the first portion of the first laser beam wherein the first portion of the first laser beam is refracted by the first oscillating mirror in a third direction.

An example includes a laser system for additive manufacturing which includes a first laser beam aligned in a first direction and a second laser beam aligned in a sixth direction spaced apart from the first direction. A first partial reflecting fixed mirror is positioned aligned with the first direction which reflects a first portion of the first laser beam in a second direction and an exponentially reduced remaining second portion of the first laser beam passes through the first partial reflecting fixed mirror in the first direction. A first oscillating mirror positioned aligned with the second direction of the first portion of the first laser beam wherein the first portion of the first laser beam is refracted by the first oscillating mirror in a third direction. Further included is a third partial reflecting fixed mirror positioned aligned with the sixth direction and reflects a first portion of the second laser beam in a seventh direction and an exponentially reduced remaining second portion of the second laser beam passes through the third partial reflecting fixed mirror in the sixth direction. A third oscillating mirror positioned aligned with the seventh direction of the first portion of the second laser beam wherein the first portion of the second laser beam is refracted by the third oscillating mirror in an eighth direction.

An example includes a method for operating a laser assembly for additive manufacturing which includes the step of emitting a first laser beam in a first direction with a first partially reflecting fixed mirror aligned with the first direction. The method further includes the steps of reflecting a first portion of the first laser beam in a second direction with a first oscillating mirror aligned in the second direction and refracting the first portion of the first laser beam with the first oscillating mirror in a third direction to a material bed. The method further includes a step of passing an exponentially reduced remaining second portion of the first laser beam in the first direction through the first partially reflecting fixed mirror.

The features, functions, and advantages that have been discussed can be achieved independently in various embodiments or may be combined in yet other embodiments further details of which can be seen with reference to the following description and drawings.

DESCRIPTION

Figure 1:
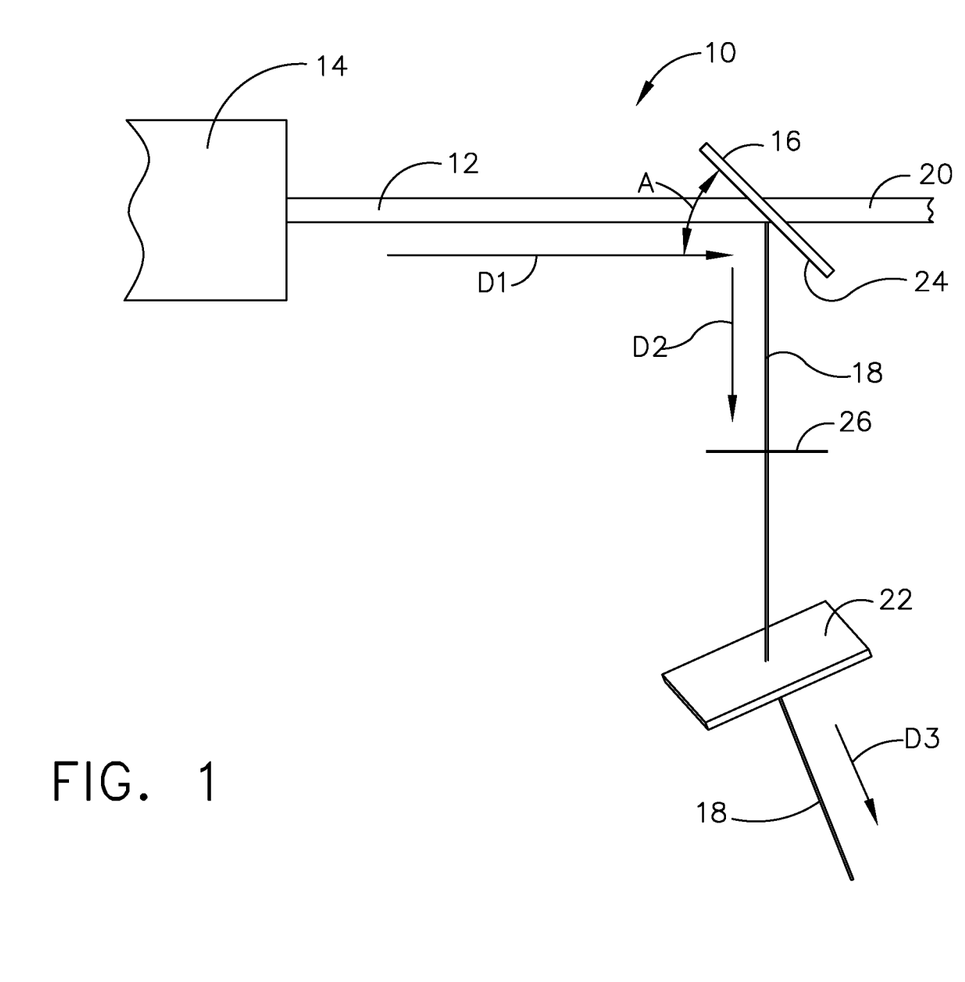
FIG. 1 is a side elevation schematic view of a first laser beam assembly for additive manufacturing with the first laser beam extending in a first direction with a first partial reflective fixed reflecting mirror aligned with the first direction reflecting a first portion of the first laser beam.

In referring to FIG. 1, laser assembly 10 for additive manufacturing includes first laser beam 12 originating from first laser source 14 such as a carbon dioxide or neodymiumdoped yttrium aluminum garnet $Nd:Y_3Al_5O_{12}$ "Nd: YAG" laser. First laser beam 12 is aligned in first direction D1. First partial reflecting fixed mirror 16, such as a laser line cube beam splitter is positioned aligned with first direction D1, which results in the reflection of first portion 18 of first laser beam 12. First portion 18 of first laser beam 12 extends in second direction D2 and exponentially reduced remaining second portion 20 of first laser beam 12 passes through first partial reflecting fixed mirror 16 in first direction D1.

First partial reflecting fixed mirror 16 reflects a constant amount of power from the laser beam that is impacting first partial reflecting fixed mirror 16. In the present example first partial reflecting fixed mirror 16 reflects five percent (5%) of first laser beam 12 and exponentially reduced remaining second portion 20 of first laser beam 12. A partial reflecting fixed mirror and those similarly constructed will each reflect a fixed amount of laser power. A similar partial reflecting fixed mirror positioned aligned with exponentially reduced remaining second portion 20 would reflect the same fixed amount of power five percent (5%) of the power of first laser beam 12. As a result, similar partial reflecting fixed mirrors positioned in the path of first direction, which received a reduced amount of power of first laser beam 12 can reflect five percent (5%) of the power of first laser beam 12. The similar configurations of partial reflecting fixed mirrors will reflect the same fixed amount of power regardless of the power of the laser beam impacting the partial reflecting fixed mirror so long as the amount of the power of the laser beam impacting that particular partial reflecting fixed mirror is sufficient to provide the fixed amount of power that is to be reflected by that configuration of the partial reflecting fixed mirror.

The following is a table setting forth the fixed amount of laser beam power reflected by successively positioned partial reflecting fixed mirrors. As you can see in this table, the first column identifies the mirrors successively aligned from the laser source; the second column indicates the beam power lever passing through the mirror; the third column indicates the power of the laser beam being reflected from that mirror and the fourth column indicates a percentage of the beam power that is reflected from the laser beam impacting that mirror. As is shown, a fixed amount of power is being reflected, which in this example is five percent (5%) of the power of the laser beam that originated from the laser source. In this way, each amount of power reflected is the same providing a fabricator the ability to distribute the same amount of power to different locations within a material or powder or resin bed with employing similarly configured partial reflecting fixed mirrors positioned along a path of a laser beam. This configuration of partial reflecting fixed mirrors reduces the need for calibration and anomalistic occurrences of laser beam power originating from different laser power sources reaching a material bed in an additive manufacturing process thereby providing enhanced quality of production of parts.

| Mirror | Beam Power Level | Power Reflected | Percent of Beam Reflected |
|---|---|---|---|
| 0 | 100% | | |
| 1 | 95% | 5% | 5.00% |
| 2 | 90% | 5% | 5.26% |
| 3 | 85% | 5% | 5.56% |
| 4 | 80% | 5% | 5.88% |
| 5 | 75% | 5% | 6.25% |
| 6 | 70% | 5% | 6.67% |
| 7 | 65% | 5% | 7.14% |
| 8 | 60% | 5% | 7.69% |
| 9 | 55% | 5% | 8.33% |
| 10 | 50% | 5% | 9.09% |
| 11 | 45% | 5% | 10.00% |
| 12 | 40% | 5% | 11.11% |
| 13 | 35% | 5% | 12.50% |
| 14 | 30% | 5% | 14.29% |
| 15 | 25% | 5% | 16.67% |
| 16 | 20% | 5% | 20.00% |
| 17 | 15% | 5% | 25.00% |
| 18 | 10% | 5% | 33.33% |
| 19 | 5% | 5% | 50.00% |
| 20 | 0% | 5% | 100.00% |

In referring to FIGS. 1 and 2, first oscillating mirror 22 positioned aligned with second direction D2 of first portion 18 of first laser beam 12 wherein first portion 18 of first laser beam 12 is refracted by first oscillating mirror 22 to extend in third direction D3, which is directed to a material bed as will be later discussed. Laser assembly 10 of further includes first partial reflecting fixed mirror 16 having surface 24 positioned in an angular relationship A relative to first direction D1 of first laser beam 12. Angular relationship A relative to first direction D1 of first laser beam 12 is forty five degrees (45°) resulting in second direction D2 of first portion 18 of first laser beam 12 extends in second direction D2 ninety degrees (90°) from first direction D1. Exponentially reduced remaining second portion 20 of first laser beam 12 passes through first partial reflective fixed mirror 16 aligned in first direction D1.

First laser shutter 26 aligned with second direction D2 of first portion 18 of first laser beam 12. The fabricator can position first laser shutter 26 in either an open or closed position, as will apply to other laser shutters herein identified. With first laser shutter in an open position, first portion 18 of first laser beam 12 extends through first laser shutter 26 and onto first oscillating mirror 22. With first laser shutter 26 in a closed position, first portion 18 of first laser beam 12 is blocked from extending through first laser shutter 26 and is blocked from reaching first oscillating mirror 22.

Figure 4:
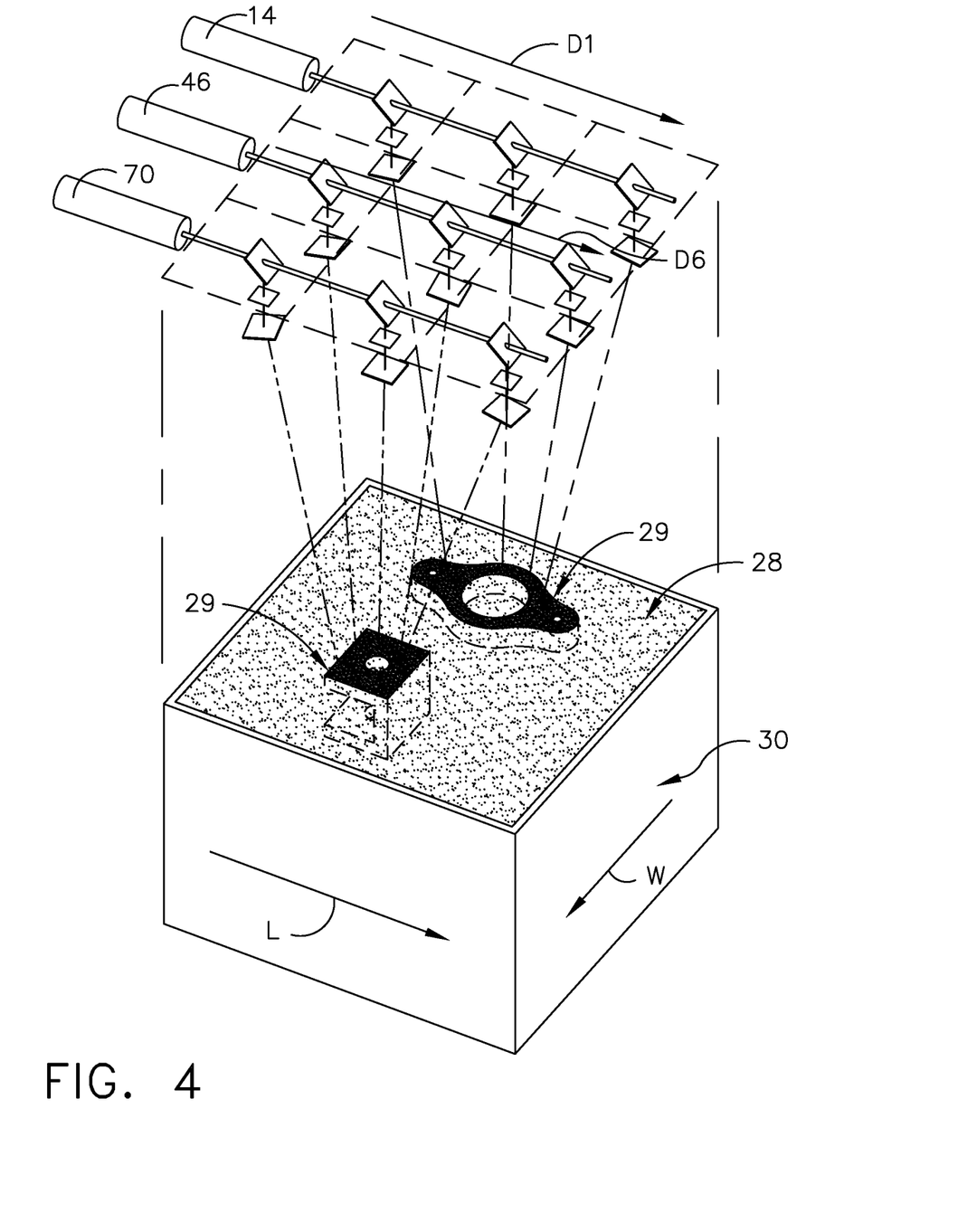
FIG. 4 is a perspective schematic view of the laser system for additive manufacturing of FIG. 3 directed to a material bed for manufacturing parts.

First portion 18 of first laser beam 12 is refracted in third direction D3 aligned with material 28 positioned in bed 30, as seen for example in FIG. 4. Material 28 can comprise one or numerous materials utilized in additive manufacturing such as polymer powder, liquid resins or ceramic resins in sintering or performing stereo-lithography on successive layers to produce a part(s) 29, as seen in FIG. 4. Other additive manufacturing techniques may employ materials 28 such as a liquid resin; may include fused deposition for solid materials; or laminated object manufacturing for sheets of material which also may employ directed laser beam power as provided by laser assembly 10 to materials 28 positioned within bed 30 which can include a reservoir with use of liquid resins or other material 28 supporting apparatus.

Figure 2:
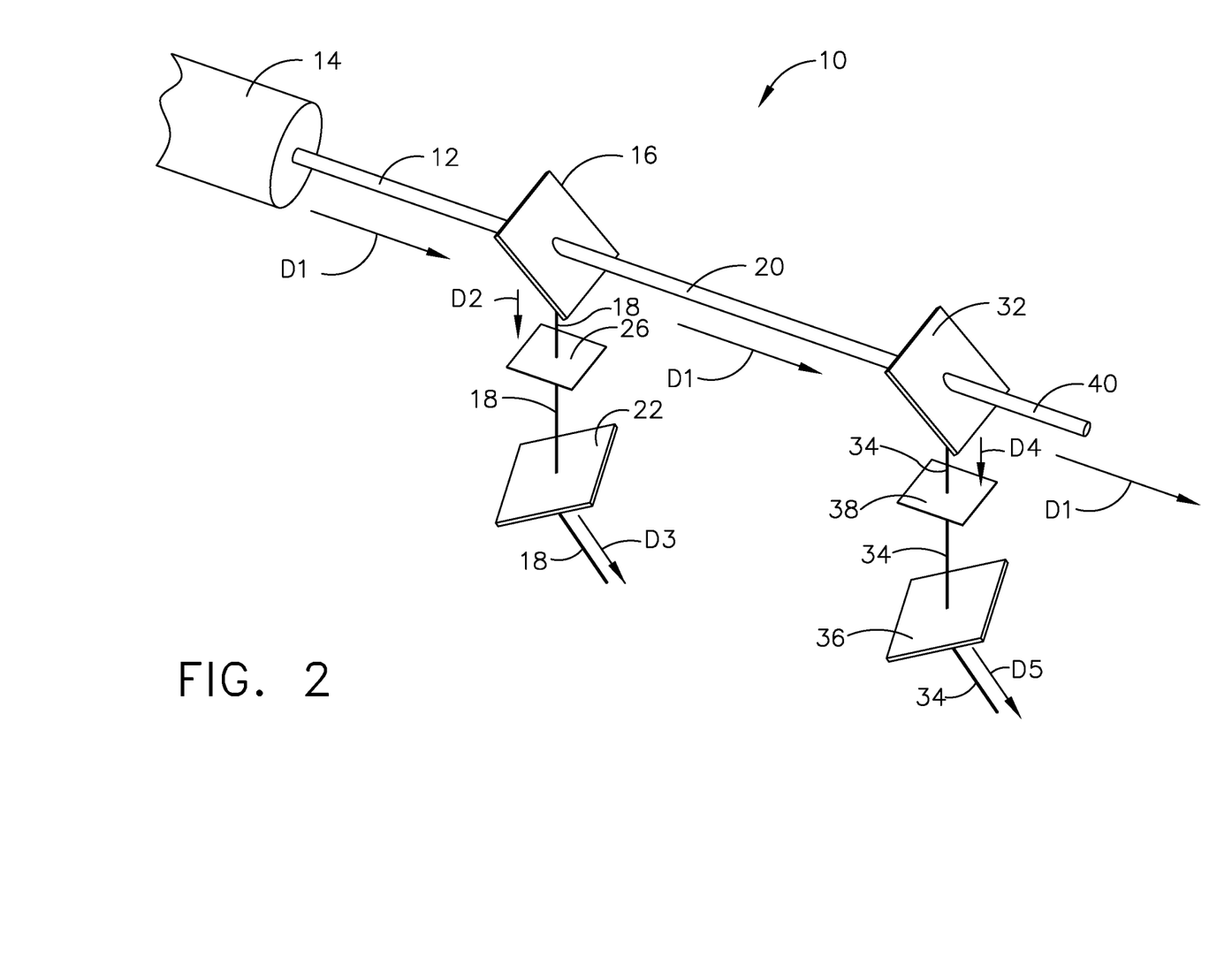
FIG. 2 is a perspective schematic view of a first laser beam assembly of FIG. 1 with a second partially reflecting fixed mirror aligned with an exponentially reduced remaining second portion of the first laser beam passing through the first partial reflecting fixed reflecting mirror.

In referring to FIG. 2, laser assembly further includes second partially reflecting fixed mirror 32 aligned with exponentially reduced remaining second portion 20 of first laser beam 12. Second partially reflecting fixed mirror 32 reflects third portion 34 of exponentially reduced remaining second portion 20 of first laser beam 12 to extend in fourth direction D4 wherein power of first portion 18 of first laser beam 12 and power of third portion 34 of exponentially reduced remaining second portion 20 of the first laser beam 12 are the same.

Second oscillating mirror 36 is positioned aligned with fourth direction D4 of third portion 34 of exponentially reduced remaining second portion 20 of first laser beam 20. Third portion 34 of exponentially reduced remaining second portion 20 extends in fourth direction D4 wherein second laser shutter 38 is positioned aligned with direction D4 such that with second laser shutter 38 in an open position third portion 34 of exponentially reduced remaining second portion 20 of first laser beam 12 extends through second laser shutter 38. Second oscillating mirror 36 aligned with third portion of exponentially reduced remaining second portion 20 of first laser beam 20 refracts third portion 34 of exponentially reduced remaining second portion 20 of first laser beam 12 in fifth direction D5 aligned with material 28 positioned within bed 30. Exponentially reduced remaining fourth portion 40 of exponentially reduced remaining second portion 20 of first laser beam 12 passes through the second partially reflecting fixed mirror 32 in first direction D1.

Figure 3:
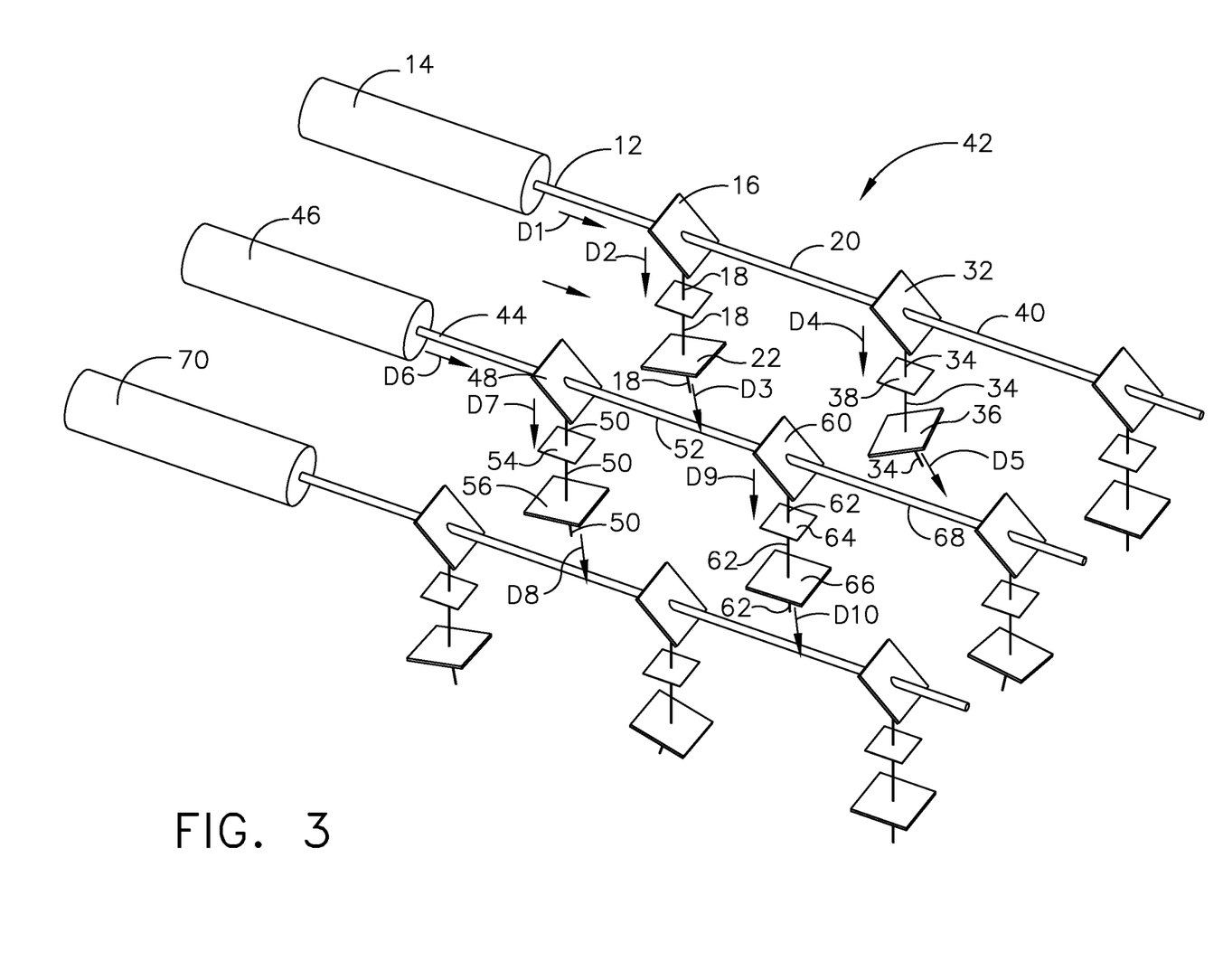
FIG. 3 is a perspective schematic view of a laser system for additive manufacturing.

In referring to FIGS. 3 and 4 laser system 42 for additive manufacturing includes first laser beam 12 aligned in first direction D1 and second laser beam 44 originating from second laser beam source 46 aligned in sixth direction D6 spaced apart from first direction D1. First partial reflecting fixed mirror 16 is positioned aligned with first direction D1 and reflects first portion 18 of first laser beam 12 and extends in second direction D2 and exponentially reduced remaining second portion 20 of first laser beam 12 passes through first partial reflecting fixed mirror 16 in first direction D1. First oscillating mirror 22 positioned in aligned with second direction D2 of first portion 18 of first laser beam 12 wherein first portion 18 of first laser beam 12 is refracted by first oscillating mirror 22 in third direction D3.

Third partial reflecting fixed mirror 48 is positioned aligned with sixth direction D6 and reflects first portion 50 of second laser beam 44 in seventh direction D7 and exponentially reduced remaining second portion 52 of second laser beam 44 passes through third partial reflecting fixed mirror 48 in sixth direction D6. First portion 50 of second laser beam 44, in this example, passes through third laser shutter 54 with third laser shutter 54 in an open position such that first portion 50 of second laser beam 44 extends to third oscillating mirror 56. Third oscillating mirror 56 positioned aligned with seventh direction D7 of first portion 50 of second laser beam 44 such that first portion 50 of second laser beam 44 is refracted by third oscillating mirror 56 in eighth direction D8.

Second partially reflecting fixed mirror 32 is aligned with first direction D1 of exponentially reduced remaining second portion 20 of first laser beam 12. Second partially reflecting fixed mirror 32 reflects third portion 34 of the exponentially reduced remaining second portion 20 of first laser beam 12 which extends in fourth direction D4. Power of first portion 18 of first laser beam 12 and power of third portion 34 of exponentially reduced remaining second portion 20 of first laser beam 12 are the same. Providing the same power of laser beam to material 28 positioned within bed 30 provides for enhanced quality of part being made and reduces the need for calibration and for varying power concerns that can be introduced by different laser beams from different laser beam sources.

Second oscillating mirror 36 is positioned aligned with fourth direction D4 of third portion 34 of exponentially reduced remaining second portion 20 of first laser beam 12. Second laser shutter 38 is positioned between second partially reflecting fixed mirror 32 and second oscillating mirror 36 as earlier described. Second oscillating mirror 36 refracts third portion 34 of exponentially reduced remaining second portion 20 of first laser beam 12 in fifth direction D5 aligned with material 28 positioned within bed 30. Exponentially reduced remaining fourth portion 40, of exponentially reduced remaining second portion 20 of first laser beam 12, passes through second partially reflecting fixed mirror 32 extending in first direction D1.

Fourth partially reflecting fixed mirror 60 aligned with sixth direction D6 of exponentially reduced remaining second portion 52 of second laser beam 44 extending in sixth direction D6. Fourth partially reflecting fixed mirror 60 reflects third portion 62 of exponentially reduced remaining second portion 52 of second laser beam 44 extending in ninth direction D9. Power of first portion 50 of second laser beam 44 and power of third portion 62 of exponentially reduced remaining second portion 52 of the second laser beam 44 are the same providing for quality production of parts. Fourth laser shutter 64 is positioned between fourth partially reflecting fixed mirror 60 and fourth oscillating mirror 66 and operates for fabricator to permit or not permit third portion 62 of exponentially reduced remaining second portion 52 of second laser beam 44 extending to fourth oscillating mirror 66, which is positioned aligned with ninth direction D9 of third portion 62 of exponentially reduced remaining second portion 52 of second laser beam 44. Fourth oscillating mirror 66 refracts third portion 62 of exponentially reduced remaining second portion 52 of second laser beam 44 in tenth direction D10 aligned with material 28 positioned within bed 30. Exponentially reduced remaining fourth portion 68, of exponentially reduced remaining second portion 52 of second laser beam 44, passes through fourth partially reflecting fixed mirror 60 extending in sixth direction D6.

Laser system 42 includes first laser beam 12, exponentially reduced remaining second portion 20 of first laser beam 12 and exponentially reduced remaining fourth portion 40 of exponentially reduced remaining second portion 20 of first laser beam 12 extending in first direction D1. Second laser beam 44, exponentially reduced remaining second portion 52 of second laser beam 44 and exponentially remaining reduced fourth portion 68 of exponentially reduced remaining second portion 52 of second laser beam 44 extend in sixth direction D6. First direction D1 and sixth direction D6 of the laser beams extend in these respective directions and extend spaced apart from one another. This configuration of laser system 42 provides laser system 42 providing laser beam sources along length L bed 30 as seen in FIG. 4 wherein the power reaching the material 28 within bed 30 is uniform along each of first direction D1 and sixth direction D6. Additional partially reflecting fixed mirrors with corresponding oscillating mirrors can be positioned along first direction D1 and along sixth direction D6 as seen in FIGS. 3 and 4 providing additional coverage in length L of bed 30 from first and second laser sources 14 and 46.

Laser system 42 includes first laser beam 12, exponentially reduced remaining second portion 20 of first laser beam 12 and exponentially reduced remaining fourth portion 40 of exponentially reduced remaining second portion 20 of first laser beam 12 extend in first direction D1 as set forth above. Second laser beam 44, exponentially reduced remaining second portion 52 of second laser beam 44 and exponentially remaining reduced fourth portion 68 of exponentially reduced remaining second portion 52 of second laser beam 44 extends in sixth direction D6. First and sixth directions extend parallel to one another as seen in FIGS. 3 and 4.

Additional coverage of bed 30 with laser beam sources can be provided in the width dimension W of bed 30. This can be provided with addition of third laser source 70 as seen in FIGS. 4 and 5 which extends coverage in width dimension W of laser beam power to bed 30.

Figure 5:
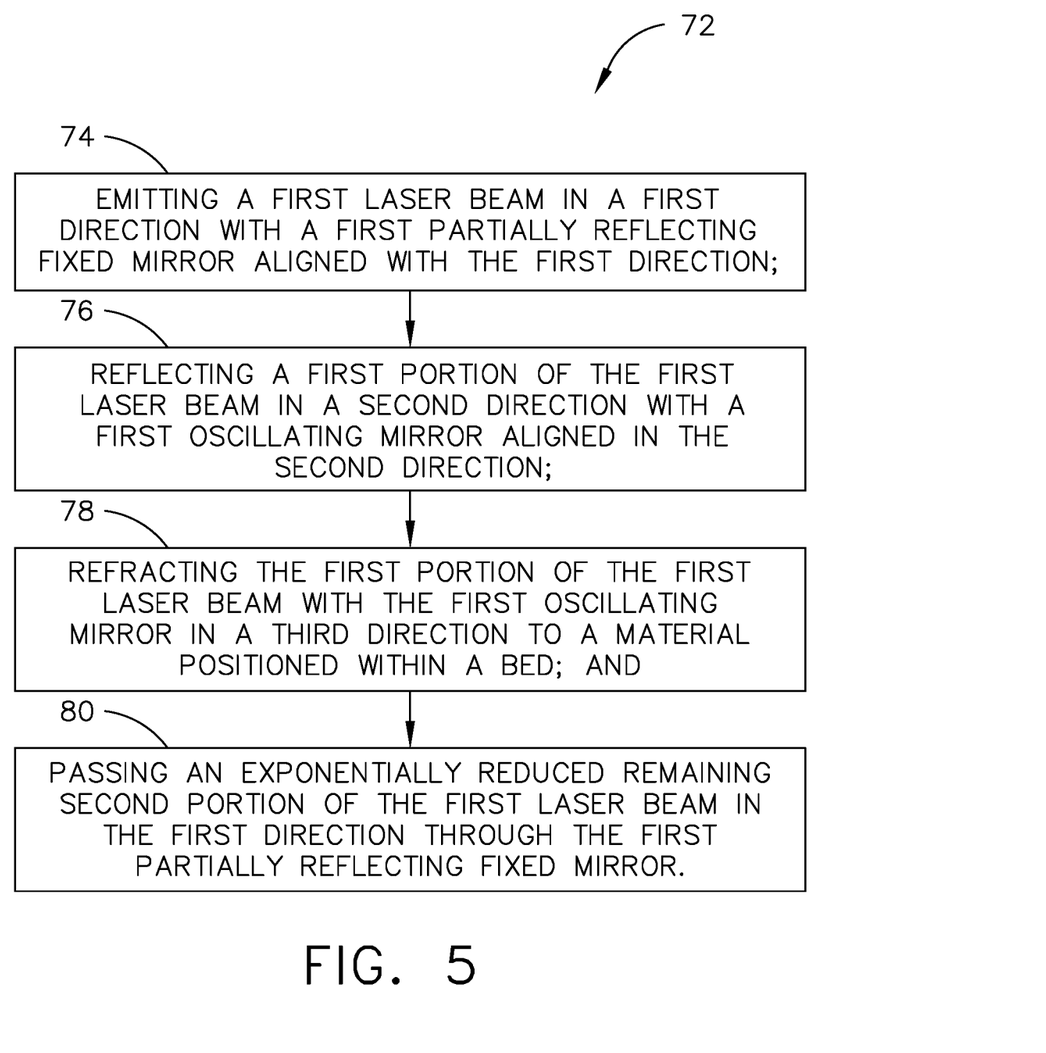
FIG. 5 is a flow chart for a method for operating a laser assembly for additive manufacturing.

In referring to FIG. 5 method 72 for operating laser assembly 10 for additive manufacturing includes step 74 of emitting first laser beam 12 in first direction D1 with first partially reflecting fixed mirror 16 aligned with first direction D1. Method 72 further includes step 76 of reflecting first portion 18 of first laser beam 12 extending in second direction D2 with first oscillating mirror 22 aligned in second direction D2. Further included in method 72 is step 78 of refracting first portion 18 of first laser beam 12 with first oscillating mirror 22 in third direction D3 to material 28 positioned within bed 30. Method 72 also includes step 80 of passing exponentially reduced remaining second portion 20 of first laser beam 12 in first direction D1 through first partially reflecting fixed mirror 16.

Method 72 for operating a laser assembly 10 further includes reflecting third portion 34 of exponentially reduced remaining second portion 20 of first laser beam 12 with second partially reflecting fixed mirror 32 in fourth direction D4 to second oscillating mirror 36 aligned in fourth direction D4. Method 72 further includes refracting third portion 34 of exponentially reduced remaining second portion 20 of first laser beam 12 in fifth direction D5 with second oscillating mirror 36 to material 28 positioned within bed 30, wherein power of first portion of first laser beam 12 and power of third portion 34 of exponentially reduced remaining second portion 20 of first laser beam 12 are the same and passing exponentially reduced remaining fourth portion 40 of first laser beam 12 through second partially reflecting fixed mirror 32.

Method 72 for operating laser assembly 10 further includes emitting second laser beam 44 in sixth direction D6 with third partially reflecting fixed mirror 48 aligned with second laser beam 44 and reflecting first portion 50 of second laser beam 44 from third partially reflecting fixed mirror 48 in seventh direction D7 with third oscillating mirror 56 aligned in seventh direction D7. Method 72 further includes refracting first portion 50 of second laser beam 44 with third oscillating mirror 56 in eighth direction D8 to material 28 positioned within bed 30. Method 72 further includes passing exponentially reduced second portion 52 of second laser beam 44 in sixth direction D6 through third partially reflecting fixed mirror 48 and reflecting third portion 62 of exponentially reduced remaining second portion 52 of second laser beam 44 in ninth direction D9 with fourth partially reflecting fixed mirror 60 to fourth oscillating mirror 66 aligned in ninth direction D9. Further included in method 72 is refracting third portion 62 of the exponentially reduced remaining second portion 52 of second laser beam 44 in tenth direction D10 with fourth oscillating mirror 66 to material 28 positioned within bed 30, wherein power of first portion 50 of second laser beam 44 and power of third portion 62 of exponentially reduced second portion 52 of second laser beam 44 are the same. In addition method 72 includes passing exponentially reduced remaining fourth portion 68 of exponentially reduced second portion 52 of second laser beam 44 in sixth direction D6 through fourth partially reflecting fixed mirror 60.

While various embodiments have been described above, this disclosure is not intended to be limited thereto. Variations can be made to the disclosed embodiments that are still within the scope of the appended claims.

What is claimed:

1. A laser assembly for additive manufacturing, comprising:

a first laser beam aligned in a first direction, wherein the first laser beam comprises a continuous wave laser;

a first partial reflecting fixed mirror positioned aligned with the first direction which reflects a first portion of the first laser beam in a second direction and an exponentially reduced remaining second portion of the first laser beam passes through the first partial reflecting fixed mirror in the first direction;

a first oscillating mirror positioned aligned with the second direction of the first portion of the first laser beam wherein the first portion of the first laser beam is refracted by the first oscillating mirror in a third direction to a material within a bed to produce a part by additive manufacturing; and a second partial reflecting fixed mirror, positioned aligned with the exponentially reduced remaining second portion of the first laser beam, which reflects a third portion of the exponentially reduced remaining second portion of the first laser beam such that a power of the first portion of the first laser beam and a power of the third portion of the exponentially reduced remaining second portion of the first laser beam have a same power; wherein the second partial reflecting fixed mirror has a greater percentage of reflectivity than a percentage of reflectivity of the first partial reflecting fixed mirror.

2. The laser assembly of claim 1, further includes the first partial reflecting fixed mirror having a surface positioned in an angular relationship relative to the first direction of the first laser beam.

3. The laser assembly of claim 2, wherein the angular relationship relative to the first direction of the first laser beam is forty five degrees (45°) resulting in the second direction of the first portion of the first laser beam extends ninety degrees (90°) from the first direction.

4. The laser assembly of claim 1, further includes a first laser shutter aligned with the second direction of the first portion of the first laser beam.

5. The laser assembly of claim 1, wherein the first portion of the first laser beam refracted in the third direction aligned with a material in a bed.

6. The laser assembly of claim 5, wherein the material is a polymer powder, liquid resin or ceramic resin.

7. The laser assembly of claim 1, wherein the exponentially reduced remaining second portion of the first laser beam is aligned with the first laser beam in the first direction.

8. The laser assembly of claim 7, further including the second partial reflecting fixed mirror aligned with the exponentially reduced remaining second portion of the first laser beam and the first laser beam.

9. The laser assembly of claim 8, wherein the second partial reflecting fixed mirror reflects the third portion of the exponentially reduced remaining second portion of the first laser beam in a fourth direction.

10. The laser assembly of claim 9, further including a second oscillating mirror is positioned aligned with the fourth direction of the third portion of the exponentially reduced remaining second portion of the first laser beam.

11. The laser assembly of claim 10, the third portion of the exponentially reduced remaining second portion of the first laser beam is refracted by the second oscillating mirror in a fifth direction aligned with a material positioned within a bed.

12. The laser assembly of claim 9, wherein a remaining exponentially reduced fourth portion of the exponentially reduced remaining second portion of the first laser beam passes through the second partial reflecting fixed mirror in the first direction.

13. A laser system for additive manufacturing, comprising:
a first laser beam, which emits a continuous wave laser, aligned in a first direction;
a second laser beam, which emits a continuous wave laser, aligned in a sixth direction spaced apart from the first direction, wherein:
a first partial reflecting fixed mirror is positioned aligned with the first direction and reflects a first portion of the first laser beam in a second direction and an exponentially reduced remaining second portion of the first laser beam passes through the first partial reflecting fixed mirror in the first direction;
a first oscillating mirror positioned aligned with the second direction of the first portion of the first laser beam wherein the first portion of the first laser beam is refracted by the first oscillating mirror in a third direction to a material within a bed to produce a part by additive manufacturing;
a second partial fixed mirror, positioned aligned with the exponentially reduced remaining second portion of the first laser beam, reflects a third portion of the exponentially reduced remaining second portion of the first laser beam such that a power of the first portion of the first laser beam and a power of the third portion of the exponentially reduced remaining second portion of the first laser beam have a same power, wherein the second partial fixed mirror has a greater percentage of reflectivity than the percentage of reflectivity of the first partial reflecting fixed mirror;
a third partial reflecting fixed mirror is positioned aligned with the sixth direction and reflects a first portion of the second laser beam in a seventh direction and an exponentially reduced remaining second portion of the second laser beam passes through the third partial reflecting fixed mirror in the sixth direction;
a third oscillating mirror positioned aligned with the seventh direction of the first portion of the second laser beam wherein the first portion of the second laser beam is refracted by the third oscillating mirror in an eighth direction; and
a fourth partial fixed mirror, positioned aligned with the exponentially reduced remaining second portion of the second laser beam, reflects a third portion of the exponentially reduced remaining second portion of the second laser beam such that a power of the first portion of the second laser beam and a power of the third portion of the exponentially reduced remaining second portion of the second laser beam have a same power.

14. The laser system of claim 13, further including:
the second partial reflecting fixed mirror aligned with the first direction of the first laser beam and of the exponentially reduced remaining second portion of the first laser beam wherein the second partial reflecting fixed mirror reflects a third portion of the exponentially reduced remaining second portion of the first laser beam in a fourth direction; and
a second oscillating mirror is positioned aligned with the fourth direction of the third portion of the exponentially reduced remaining second portion of the first laser beam, wherein:

the third portion of the exponentially reduced remaining second portion of the first laser beam is refracted by the second oscillating mirror in a fifth direction aligned with the material positioned within the bed; and
an exponentially reduced remaining fourth portion of the exponentially reduced remaining second portion of the first laser beam passes through the second partial reflecting fixed mirror in the first direction.

15. The laser system of claim 14, further including:
a fourth partial reflecting fixed mirror aligned with the sixth direction of the exponentially reduced remaining second portion of the second laser beam extending in the sixth direction, wherein the fourth partial reflecting fixed mirror reflects a third portion of the exponentially reduced remaining second portion of the second laser beam in a ninth direction; and
a fourth oscillating mirror is positioned aligned with the ninth direction of the third portion of the of the exponentially reduced remaining second portion of the second laser beam, wherein:
the third portion of the exponentially reduced remaining second portion of the second laser beam is refracted by the fourth oscillating mirror in a tenth direction aligned with the material positioned within the bed; and
an exponentially reduced remaining fourth portion of the exponentially reduced remaining second portion of the second laser beam passes through the fourth partially reflecting fixed mirror in the sixth direction.

16. The laser system of claim 15, wherein:
the first laser beam, the exponentially reduced remaining second portion of the first laser beam and the exponentially reduced remaining fourth portion of the exponentially reduced remaining second portion of the first laser beam extend in the first direction;
the second laser beam, the exponentially reduced remaining second portion of the second laser beam and the exponentially remaining reduced fourth portion of the exponentially reduced remaining second portion of the second laser beam extend in the sixth direction; and
the first and sixth directions extend spaced apart from one another.

17. The laser system of claim 15, wherein:
the first laser beam, the exponentially reduced remaining second portion of the first laser beam and the exponentially reduced remaining fourth portion of the of the exponentially reduced remaining second portion of the first laser beam extend in the first direction;
the second laser beam, the exponentially reduced remaining second portion of the second laser beam and the exponentially remaining reduced fourth portion of the exponentially reduced remaining second portion of the second laser beam extend in the sixth direction; and
the first and sixth directions extend parallel to one another.

18. A method for operating a laser assembly for additive manufacturing, comprising the step of:
emitting a first laser beam, comprising a continuous wave laser, in a first direction with a first partial reflecting fixed mirror aligned with the first direction;
reflecting a first portion of the first laser beam in a second direction with a first oscillating mirror aligned in the second direction, wherein the first oscillating mirror directs the first portion of the first laser beam in a third direction to a material within a bed to produce a part by additive manufacturing;
passing an exponentially reduced remaining second portion of the first laser beam in the first direction through the first partial reflecting fixed mirror; and reflecting a third portion of the exponentially reduced remaining second portion of the first laser beam wherein a power of the first portion of the first laser beam and a power of the third portion of the exponentially reduced remaining second portion of the first laser beam have a same power, wherein the second partial reflecting fixed mirror has a greater percentage of reflectivity than the percentage of reflectivity of the first partial reflecting fixed mirror.

19. The method for operating a laser assembly of claim 18, further including:
reflecting the third portion of the exponentially reduced remaining second portion of the first laser beam with a second partial reflecting fixed mirror in a fourth direction to a second oscillating mirror aligned in the fourth direction;
refracting the third portion of the exponentially reduced remaining second portion of the first laser beam in a fifth direction with the second oscillating mirror to a material positioned within a bed; and
passing an exponentially reduced fourth portion of the first laser beam through the second partial reflecting fixed mirror.

20. The method for operating a laser assembly of claim 18, further including:
emitting a second laser beam, comprising a continuous wave laser, in a sixth direction with a third partial reflecting fixed mirror aligned with the second laser beam;
reflecting a first portion of the second laser beam from third partial reflecting fixed mirror in a seventh direction with a third oscillating mirror aligned in the seventh direction;
refracting the first portion of the second laser beam with the third oscillating mirror in an eighth direction to a material positioned within a bed;
passing an exponentially reduced second portion of the second laser beam in the sixth direction through the third partial reflecting fixed mirror;
reflecting a third portion of the exponentially reduced remaining second portion of the second laser beam in a ninth direction with a fourth partial reflecting fixed mirror to a fourth oscillating mirror aligned in the ninth direction;
refracting the third portion of the exponentially reduced remaining second portion of the second laser beam in a tenth direction with the fourth oscillating mirror to the material positioned within the bed, wherein power of the first portion of the second laser beam and power of the third portion of the exponentially reduced second portion of the second laser beam have a same power; and
passing an exponentially reduced fourth portion of the exponentially reduced second portion of the second laser beam in the sixth direction through the fourth partially reflecting fixed mirror.

* * * * *